No. 815,331. PATENTED MAR. 20, 1906.
T. H. BUTLER.
REVERSING GEAR.
APPLICATION FILED MAR. 10, 1905.
2 SHEETS—SHEET 1.
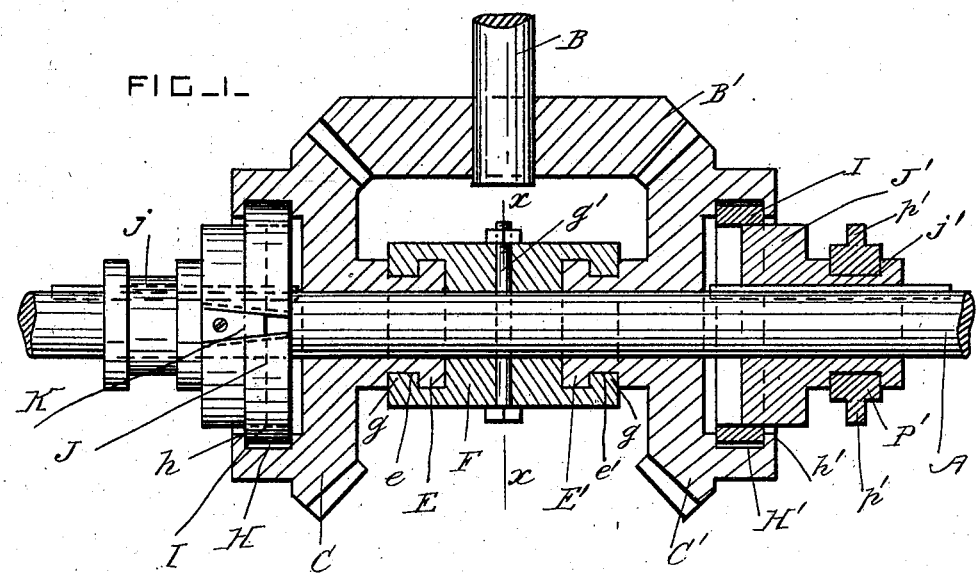
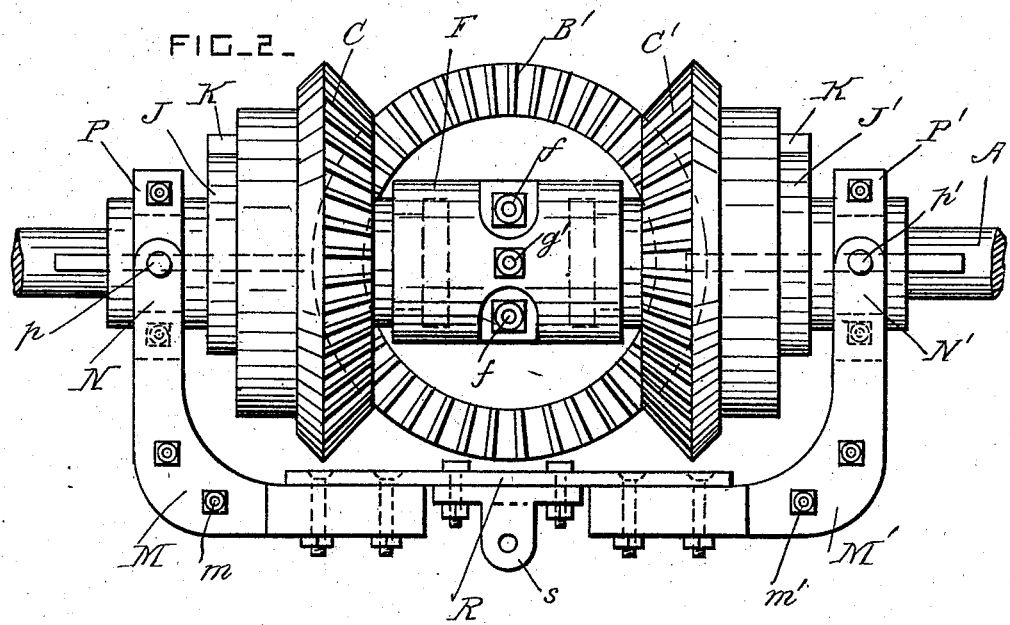
WITNESSES:
Robt. A. Cissel
Wm H Bates
INVENTOR
Thomas H. Butler
BY Herbert W. P. Jenner
Attorney No. 815,331. PATENTED MAR. 20, 1906.
T. H. BUTLER.
REVERSING GEAR.
APPLICATION FILED MAR. 10, 1905.
2 SHEETS—SHEET 2.
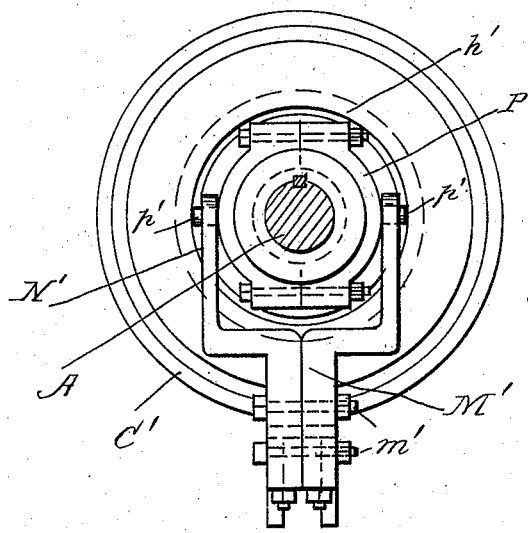
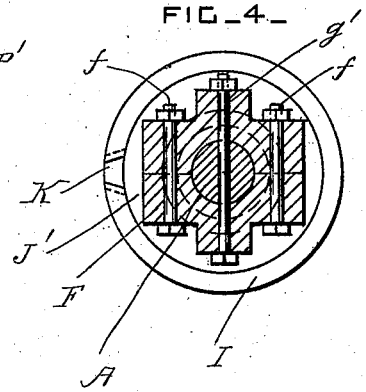
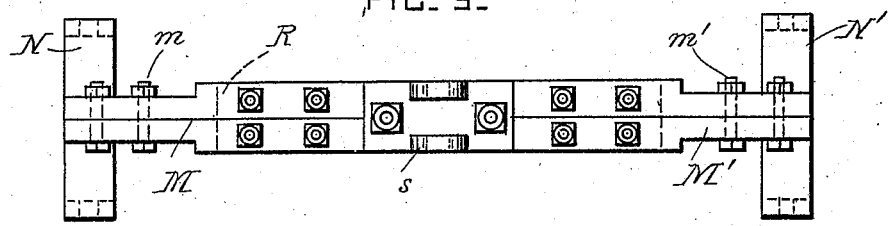
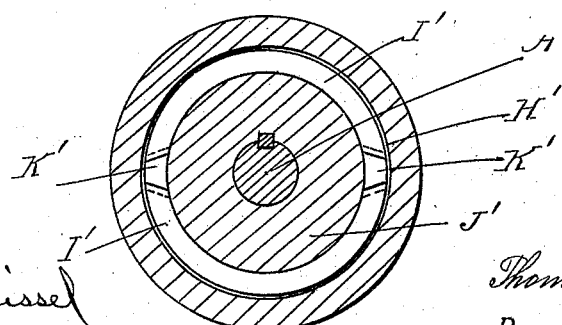
WITNESSES:
Robt. A. Cissel
Wm H Bates
INVENTOR
Thomas H. Butler.
By Herbert W. Jenner,
Attorney

UNITED STATES PATENT OFFICE.

THOMAS H. BUTLER, OF BALTIMORE, MARYLAND.

REVERSING-GEAR.

No. 815,331.

Specification of Letters Patent.

Patented March 20, 1906.

Application filed March 10, 1905. Serial No. 249,411.

*To all whom it may concern:*

Be it known that I, THOMAS H. BUTLER, a citizen of the United States, residing at Baltimore city, State of Maryland, have invented certain new and useful Improvements in Reversing-Gear; and I do hereby declare the following to be a full, clear, and exact description of the invention, such as will enable others skilled in the art to which it appertains to make and use the same.

This invention relates to reversing-gear for altering the direction of revolution of a driving-shaft, more particularly in an ice-cutting machine; and it consists in the novel construction and combination of the parts hereinafter fully described and claimed.

In the drawings, Figure 1 is a longitudinal section through the driving mechanism. Fig. 2 is a plan view of the driving mechanism. Fig. 3 is an end view of the driving mechanism. Fig. 4 is a cross-section taken on line $x$ $x$ in Fig. 1. Fig. 5 is a detail front view of the operating-arms. Fig. 6 is a modification.

A is the motor-shaft, or other equivalent shaft, which is driven by any suitable motor, whether directly or indirectly.

B is the driving-shaft, which is driven in opposite directions from the shaft A by means of suitable gearing and clutch mechanism. These two shafts are journaled in bearings of any approved construction, which are not shown in the drawings.

C and C' are two similar beveled toothed wheels, which are mounted loose upon the shaft A, and B' is a beveled toothed wheel which is secured on the shaft B and which gears into the two wheels C and C'. The wheel C has a projecting hub E, provided with a circumferential groove $e$, and the wheel C' has a projecting hub E', provided with a circumferential groove $e'$.

F is a coupling-block formed of two similar halves, which separate longitudinally and are secured together by bolts $f$. The block F has projections $g$, which engage with the grooves $e$ and $e'$ of the said hubs, and $g'$ is a bolt or pin which passes through the halves of the block F and through the shaft A and prevents the block F from either revolving or sliding longitudinally upon the said shaft. The wheel C has also a circular chamber H formed in its back, and this chamber is provided with a lip or flange $h$. The wheel C' in a similar manner is provided with a circular chamber H', having a flange $h'$. The chamber of each wheel forms a friction clutch member. Each chamber is provided with a split spring-ring I, which forms the other friction clutch member.

Two disks J and J' are provided and are splined to the shaft A, and these disks slide within the rings I. The disk J is provided with a hub having a circumferential groove $j$, and the disk J' is provided with a hub having a circumferential groove $j'$. Each disk J and J' has a wedge K secured to its periphery and projecting between the ends of the split spring-ring to which it pertains, and this wedge is preferably dovetailed, so as to force the ends of the ring outward at the same time as it presses them apart. Each ring is arranged in one of the chambers, and the lip or flange of the chamber prevents it from sliding longitudinally. The clutches are thrown into and out of engagement by sliding the disks J and J' longitudinally upon the shaft A. When either disk is moved toward the wheel to which it pertains, the wedge secured to it expands the split spring-ring and forces it into frictional driving contact with the periphery of its chamber. The clutch members are operated by means of similar arms M and M', each of which is formed of two longitudinal halves, which are secured together by bolts $m$ and $m'$. The arms M have a forked jaw N at one end, and the arms M' have a similar forked jaw N'.

P is a collar formed in two longitudinal halves secured together by bolts and journaled in the groove $j$ of the disk J. The collar P has projecting pivots $p$, by means of which it is pivoted in the jaw N.

P' is a collar also formed in longitudinal halves secured together by bolts. The collar P' is journaled in the groove $j'$ of the disk J', and it has projecting pivots $p'$, which engage with the jaw N'.

R is a plate or bar secured to the adjacent end portions of the operating-arms M and M', and $s$ is a double eye at the middle part of the bar R for the attachment of the operating-lever or other approved operating device. The clutches are operated when the bar R is slid longitudinally, as hereinbefore described, and when the clutches are placed in an intermediate position, as shown in the drawings, the split spring-rings are revolved in their chambers and do not revolve the toothed wheels.

In the modification shown in Fig. 6 the inner clutch members are formed of a plurality of ring-segments I', and the disks J or J', or both of them, are provided with a plurality of wedges K', similar to the wedges K, and arranged between the ends of the ring-segments I'.

What I claim is—

1. The combination, with a shaft, and two wheels mounted loosely thereon and provided with hubs having circumferential grooves; of a block secured to the said shaft between the said wheels and provided with projections which engage with the said grooves, and clutches for connecting the said wheels alternately with the said shaft.

2. The combination, with a shaft, and two wheels mounted loosely thereon and provided with hubs having circumferential grooves; of a block formed of two longitudinal halves and provided with projections which engage with the said grooves, and a pin which passes through the said block and shaft.

3. The combination, with a shaft, and two wheels mounted loosely thereon and provided with hubs having circumferential grooves; of a block formed of sections and having projections which engage with the said grooves, means for securing the said block-sections to the said shaft, and clutch mechanism for connecting the said wheels alternately with the said shaft.

4. The combination, with a shaft, and two wheels mounted loosely thereon and provided with clutch members and hubs having circumferential grooves; of a block secured to the said shaft and provided with projections which engage with the said grooves, slidable clutch members splined to the said shaft and provided with circumferential grooves, collars arranged in the grooves of the said clutch members, operating-arms pivoted to the said collars, said arms being formed of longitudinal arm-sections, and an operating-bar connecting together the adjacent end portions of the said arms.

In testimony whereof I affix my signature in presence of two witnesses.

THOMAS H. BUTLER.

Witnesses:
BERNARD A. SCHMITZ,
PHILIP ROLLE.